(12) United States Patent
Revankar et al.

(10) Patent No.: US 12,088,618 B2
(45) Date of Patent: Sep. 10, 2024

(54) METHODS AND SYSTEMS FOR ASSET RISK DETERMINATION AND UTILIZATION FOR THREAT MITIGATION

(71) Applicant: Qualys, Inc., Foster City, CA (US)

(72) Inventors: Mehul Krishnanand Revankar, Columbus, GA (US); Sumedh S. Thakar, Foster City, CA (US); Anand Paturi, San Francisco, CA (US)

(73) Assignee: Qualys, Inc., Foster City, CA (US)

( * ) Notice: Subject to any disclaimer, the term of this patent is extended or adjusted under 35 U.S.C. 154(b) by 157 days.

(21) Appl. No.: 17/844,566

(22) Filed: Jun. 20, 2022

(65) Prior Publication Data

US 2023/0412630 A1     Dec. 21, 2023

(51) Int. Cl.
*H04L 9/40* (2022.01)

(52) U.S. Cl.
CPC ...... *H04L 63/1433* (2013.01); *H04L 63/1441* (2013.01)

(58) Field of Classification Search
CPC .......... H04L 63/1433; H04L 63/1441
USPC .......................................... 726/25
See application file for complete search history.

(56) References Cited

U.S. PATENT DOCUMENTS

| | | | | |
|---|---|---|---|---|
| 7,890,869 | B1 * | 2/2011 | Mayer | G06F 21/577 709/224 |
| 8,984,643 | B1 * | 3/2015 | Krisher | H04L 63/1408 726/25 |
| 9,692,778 | B1 * | 6/2017 | Mohanty | G06F 9/45533 |
| 10,277,620 | B2 * | 4/2019 | Beale | H04L 63/1433 |
| 11,863,578 | B1 * | 1/2024 | Speck | G06N 5/022 |
| 2015/0237062 | A1 * | 8/2015 | Roytman | H04L 63/1433 726/25 |
| 2015/0237065 | A1 * | 8/2015 | Roytman | H04L 63/1433 726/25 |
| 2018/0136921 | A1 * | 5/2018 | Pfleger de Aguiar | G06N 7/01 |
| 2018/0351987 | A1 * | 12/2018 | Patel | G06F 21/577 |
| 2019/0260796 | A1 * | 8/2019 | Hamdi | G06F 7/24 |
| 2020/0162497 | A1 * | 5/2020 | Iyer | H04L 63/164 |
| 2021/0288995 | A1 * | 9/2021 | Attar | H04L 41/0879 |
| 2022/0129560 | A1 * | 4/2022 | Bulut | G06F 21/577 |
| 2022/0345483 | A1 * | 10/2022 | Shua | H04L 9/0825 |

(Continued)

OTHER PUBLICATIONS https://www.first.org/cvss/?_sm_au_=iVVqrLHVjHNW4s4F, Common Vulnerability Scoring System SIG, 2023, Forum of Incident Response and Security Teams, 2 pages.

(Continued)

*Primary Examiner* — Thanh T Le
(74) *Attorney, Agent, or Firm* — Baker & McKenzie LLP

(57) ABSTRACT

Disclosed are methods and systems for assessing system risks associated with one or more assets coupled to a network and mitigating against said system risks. According to one implementation, a method for assessing a system risk comprises receiving network data associated with a first asset communicatively coupled to a network, quantifying the network data, and generating a risk parameter using the quantified network data and vulnerability data associated with the network. The method further comprises determining, based on the risk parameter that a security risk of a first asset of the network is higher than the security risk of a second asset of the network. Upon this determining, the method initiates remediation operations that first secure the first asset on the network against a security breach to the network.

20 Claims, 5 Drawing Sheets

(56) References Cited

U.S. PATENT DOCUMENTS

| | | | | |
|---|---|---|---|---|
| 2022/0394055 | A1* | 12/2022 | Mukkamala | H04L 63/1433 |
| 2023/0132703 | A1* | 5/2023 | Marsenic | H04L 63/1433 |
| | | | | 726/25 |
| 2023/0208870 | A1* | 6/2023 | Yellapragada | G06F 21/53 |
| | | | | 726/22 |
| 2023/0208871 | A1* | 6/2023 | Yellapragada | G06N 5/046 |
| | | | | 726/25 |
| 2023/0231867 | A1* | 7/2023 | Rampura Venkatachar | |
| | | | | G06Q 10/0635 |
| | | | | 726/25 |
| 2023/0319095 | A1* | 10/2023 | Kalbo | H04L 63/1425 |
| | | | | 726/25 |
| 2023/0336581 | A1* | 10/2023 | Dunn | G06F 21/577 |
| 2023/0388331 | A1* | 11/2023 | Finley | H04L 63/1433 |
| 2023/0412635 | A1* | 12/2023 | Binyamini | G06N 20/00 |
| 2024/0048596 | A1* | 2/2024 | Crabtree | H04L 63/20 |
| 2024/0089272 | A1* | 3/2024 | Gilad | H04L 63/1416 |

OTHER PUBLICATIONS https://nvd.nist.gov/vuln/detail/CVE-2021-36942, "CVE-2021-36942 Detail", 2023, National Vulnerability Database (NVB), National Institute of Standards and Technology, U.S. Department of Commerce, 4 pages.

https://docs.tenable.com/vulnerability-management/Content/Lumin/LuminMetrics.htm#AES, "Tenable Lumin Metrics", 2023, Tenable Vulnerability Management, Tenable, Inc., 10 pages.

https://docs.tenable.com/security-center/Content/RiskMetrics.htm, "CVSS vs. VPR", Tenable Security Center 6.1.x User Guide, Vulnerability Analysis, 2023, Tenable, Inc., 5 pages.

https://help.kennasecurity.com/hc/en-us/articles/360026160592-Vulnerability-Scoring-in-Kenna?_sm_au_=iVVqrLHVjHNW4s4FKKM6NKsW8f6TG, "Vulnerability Scoring in Cisco Vulnerability Management", Jul. 11, 2023, Kenna FAQ, Keena Security, 4 pages.

* cited by examiner

500

502
RECEIVING NETWORK DATA ASSOCIATED WITH A FIRST SYSTEM OF A NETWORK OR A SECOND SYSTEM OF THE NETWORK, THE NETWORK DATA COMPRISING FIRST DATA, SECOND DATA, THIRD DATA, FOURTH DATA, FIFTH DATA, AND SIXTH DATA

504
QUANTIFYING THE FIRST DATA, THE SECOND DATA, THE THIRD DATA, THE FOURTH DATA, THE FIFTH DATA, AND THE SIXTH DATA

506
DETERMINING A RISK PARAMETER BASED ON THE QUANTIFYING, THE RISK PARAMETER INDICATING A SECURITY POSTURE OF THE FIRST SYSTEM OR THE SECOND SYSTEM

508
GENERATING A VULNERABILITY PROFILE FOR THE FIRST SYSTEM OF THE NETWORK OR THE SECOND SYSTEM OF THE NETWORK BASED ON THE RISK PARAMETER, THE VULNERABILITY PROFILE INDICATING A SECURITY WEAKNESS OF THE FIRST SYSTEM OR THE SECOND SYSTEM

510
DETERMINING BASED ON THE SECURITY WEAKNESS OF THE FIRST SYSTEM OR THE SECOND SYSTEM, A REMEDIATION PROTOCOL COMPRISING REMEDIATION STEPS FOR MINIMIZING THE SECURITY WEAKNESS OF THE FIRST SYSTEM OF THE NETWORK OR THE SECOND SYSTEM OF THE NETWORK

FIG. 5

METHODS AND SYSTEMS FOR ASSET RISK DETERMINATION AND UTILIZATION FOR THREAT MITIGATION

TECHNICAL FIELD

Disclosed embodiments herein relate generally to computer security, and more particularly to systems and methods for locally or remotely determining asset/system risk and vulnerabilities and mitigating against said asset/system risk and vulnerabilities in a computing network.

BACKGROUND

Computer networks offer users ease and efficiency in exchanging information. Computer networks are typically comprised of systems/devices (e.g., integrated servers, routers, terminals and other components) that interoperate and share information. Such networks manage a growing list of a variety of needs including transportation, agriculture, energy management, communications, and defense applications.

Unfortunately, the very interoperability and sophisticated integration of technology that make computer networks such valuable assets also make them vulnerable to security attacks or security breaches, and make dependence on networks a potential liability. Numerous examples of planned network attacks, such as viruses, worms, and spyware have shown how interconnectivity can be used to spread harmful program code. In addition, public or open network architectures, such as the Internet, permit hackers to have access to information on many different computers. These malicious attackers attempt to gain unauthorized access to messages generated by a user's computer and to resources of the user's computer, as well as to use knowledge regarding the operations of the protocol stack and operating systems of users' computers in an effort to gain access to their computers without authorization. Such illicit activity presents a significant security risk to any computer communicatively coupled to the network. Furthermore, organized groups have performed malicious and coordinated attacks against various large online targets having multiple different network configurations.

Moreover, security and IT teams that manage computer networks are often overwhelmed with the sheer number of vulnerabilities to which assets or systems coupled to such networks are exposed to on a daily basis. In some cases, about 40% or so of the vulnerabilities associated with most computer networks that are reported are either rated as either high or critical in severity. Because security and IT teams usually have limited resources to patch such vulnerabilities, it is often the case that patches needed to resolve vulnerability issues of computer networks are often not deployed at all or deployed after a long time leaving organizations exposed to unnecessary risks before the patches are deployed. Thus, it is important that security and IT teams identify the right set of vulnerabilities or the most critical vulnerabilities and resolve security issues associated with said vulnerabilities before proceeding to resolve other less prioritized vulnerabilities of a network in order to mitigate against the most significant security risks to which the computer network is exposed to.

Assessing risk for a given vulnerability or misconfiguration of a given computer network is easier said than done. For example, while network administrators or computer security experts may prioritize vulnerabilities today based on the Common Vulnerability Scoring System (CVSS) rating system which represents the technical severity of the vulnerability, this approach does not account for the risks identified vulnerabilities from the vulnerability assessment pose to the computer network or organization within which the computer network is implemented. Moreover, the CVSS method of quantifying risk provides an inefficient model because network administrators or computer security experts may end up patching vulnerabilities associated with the CVSS model that may not reduce significant risks to the computer network. As an example, some network administrators may use a CVSS rating to rate CVE-2020-13112 (Common Vulnerability and Exposures (CVE) rating for Amazon Linux Security Advisory for libexif: AL2012-2020-320) to generate a score of 9.1. However, CVE-2020-1311 has no known exploits available and is considered a critical vulnerability based on severity. On the other hand a CVE-2021-36942 (Windows LSA Spoofing Vulnerability) is rated at 5.3 by the National vulnerability Database (NVD) but is actively exploited by malware groups and threat actors. The exploit code maturity may be weaponized, making it easy for attackers to exploit the vulnerability associated with CVE-2021-36942 and compromise and infect systems communicatively coupled to the network. Thus, while CVE-2020-13112 may have a higher CVSS rating than a CVE-2021-36942, from a risk perspective, computer networks are at a higher risk from CVE-2021-36942 than CVE-2020-13112 and may require mitigation strategies that prioritize CVE-2021-36942 over CVE-2020-13112.

SUMMARY

Disclosed are methods and systems for assessing system risks associated with one or more assets communicatively coupled to a network and mitigating against said system risks. According to one implementation, a method for assessing a system risk comprises receiving, using one or more computing device processors, network data associated with a first asset communicatively coupled to a network. The network data may include: first data associated with criticality of the asset; second data associated with misconfiguration or vulnerabilities found on the asset; third data associated with evidence of malware information detected on the asset; fourth data associated with a presence of end-of-life software or hardware available on the asset; and fifth data associated with location of the asset with in the network. The method may further comprise determining, using the one or more computing device processors and based on the first data, a first vulnerability parameter of the first asset. The criticality information of the network may parameterize the first vulnerability parameter of the first asset. The method may further comprise quantifying, using the one or more computing device processors, the second data, the third data, the fourth data, and the fifth data and generating a first risk parameter based on the vulnerability parameter, the quantified second data, the quantified third data, the quantified fourth data, and the quantified fifth data. According to some implementations, the method may comprise determining, using the one or more computing device processors and based on the first risk parameter, that the first asset is at a higher risk from a security breach relative to the second asset. This determination may facilitate initiating, using the one or more computing device processors, the generation of one or more security operations that mitigate against the security breach, the one or more security operations comprising a sequence of operations that at least partially secure the first asset against the security breach.

BRIEF DESCRIPTION OF THE DRAWINGS

The disclosure is illustrated by way of example, and not by way of limitation in the figures of the accompanying drawings in which like reference numerals are used to refer to similar elements. It is emphasized that various features may not be drawn to scale and the dimensions of various features may be arbitrarily increased or reduced for clarity of discussion. Further, some components may be omitted in certain figures for clarity of discussion.

FIG. 5 shows an example flowchart for determining vulnerability associated with an asset or system communicatively coupled to a network in accordance with some embodiments of this disclosure.

DETAILED DESCRIPTION

Figure 1:
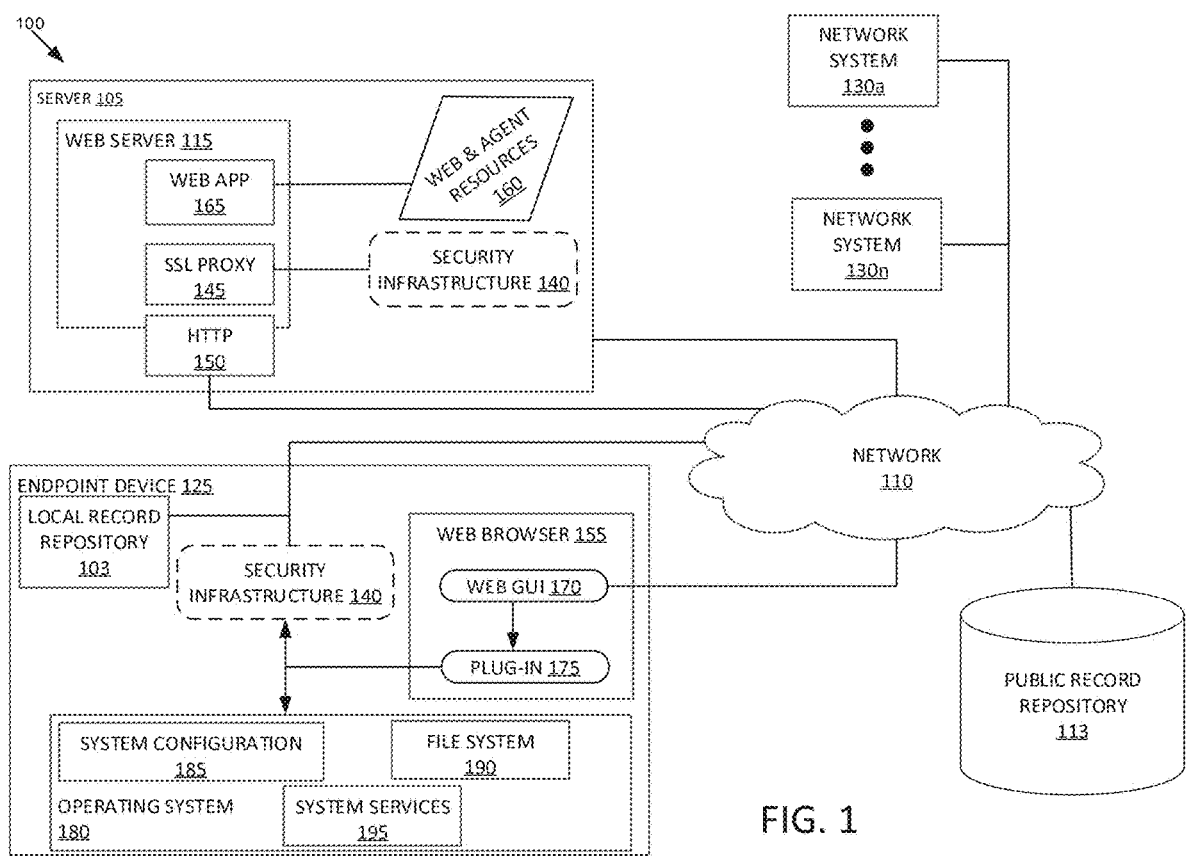
FIG. 1 shows a high level diagram of an example system for assessing the risk of a system or device communicatively coupled to a network according to some embodiments of this disclosure.

The present disclosure describes various techniques and systems for locally or remotely determining asset risk or system risk and mitigating against said asset or system risk in a computing network. In one embodiment, the instant disclosure provides a new approach for prioritizing vulnerabilities associated with a computer network (simply network hereinafter), prioritizing and mitigating against risks associated with assets or groups of assets coupled to the network. This beneficially allows a security expert or a network administrator to prioritize remediation operations that first mitigate against the maximum risks to which the network may be exposed to before addressing the less serious security risks associated the network. The present disclosure also provides a new approach for quantifying cybersecurity risk of a network for risk assessment, determining remediation operations that mitigate against the quantified cybersecurity/network security risk, tracking of risk reduction trends over time (e.g., during a first time window, a second time window, etc.), and optimizing security protocols of the network based on the tracking.

In the computer security space, threat-actors or adversaries such as Advanced Persistent Threat (APT) groups generally implement attack execution operations for myriad reasons when attacking computing devices. Attack execution operations could comprise one or more techniques, tactics, and/or practices used by a threat-actor to execute an attack campaign. As part of executing attack execution operations, threat-actors may seek vulnerabilities and risks associated with a network, hold computing devices on the network hostage via denial of service attacks, seek backdoor channels into computing devices to bypass normal authentication protocols on the network, compromise systems on the network using worms and keyloggers, eavesdrop, phish and spoof to obtain data, on the network, etc. Because of this, individuals and organizations generally have some form of computer security infrastructure that deal with threats posed by threat-actor activities such as those mentioned above.

Usually, most users adopt computer security infrastructure on computer networks that combine many security features associated with one or more computer security products. The techniques disclosed herein facilitate leveraging data generated from one or more security features associated with one or more computer security products in a manner that provides a holistic or complete view into the content and context of risk associated with a network to which multiple devices and systems are communicatively coupled to. The techniques described herein advantageously provide insight into risks and vulnerabilities to which the network is exposed to and in some cases, sequences attack steps associated with a given risk or vulnerability in order of priority. Additionally, the techniques discussed herein allow users to quantify risks and vulnerabilities associated with a network to further allow automatic adaptation of remediation strategies that appropriately account for and otherwise remediate against said risks and vulnerabilities. More specifically, the techniques discussed herein enable users to generate or otherwise sequence remediation steps or otherwise resolve remediation steps into component steps that systematically mitigate against attack steps by a threat-actor who exploits said system vulnerabilities and/or system risks.

System Environment

Illustrated in FIG. 1 is a high level diagram of an example system 100 for executing the principles disclosed herein. In the illustrated implementation, the system 100 may include multiple network devices such as server 105, endpoint device 125, public record repository 113, network systems 130a . . . 130n all communicatively coupled to the network 110. While a single server 105 and a single endpoint device 125 are illustrated, the disclosed principles and techniques could be expanded to include multiple servers 105 and endpoint devices 125.

In some embodiments, the server 105 may include a computing device such as a mainframe server, a content server, a communication server, a laptop computer, a desktop computer, a handheld computing device, a smart phone, a smart watch, a wearable device, a touch screen, a biometric device, a video processing device, an audio processing device, a virtual machine, a cloud-based computing solution and/or service, and/or the like. The server 105 may include a plurality of computing devices configured to communicate with one another and/or implement the techniques described herein.

Figure 2:
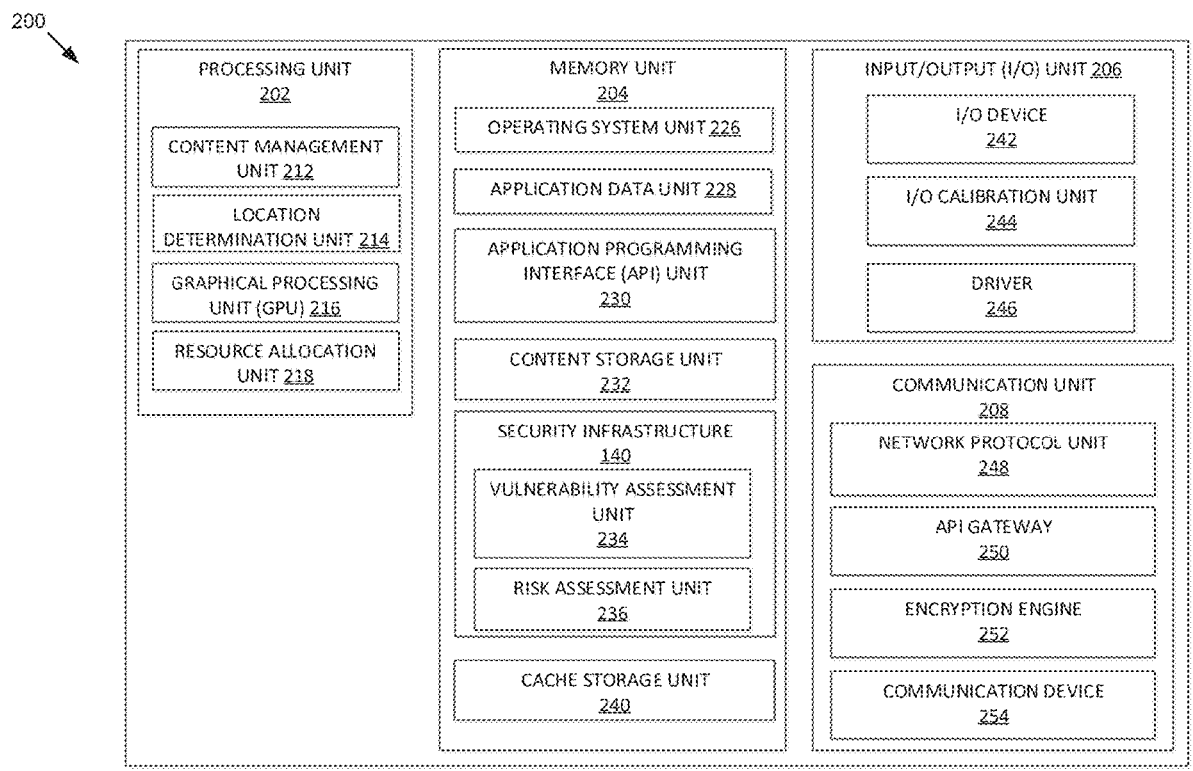
FIG. 2 is a functional block diagram of a computing environment, in accordance with some embodiments of this disclosure.
Figure 3:
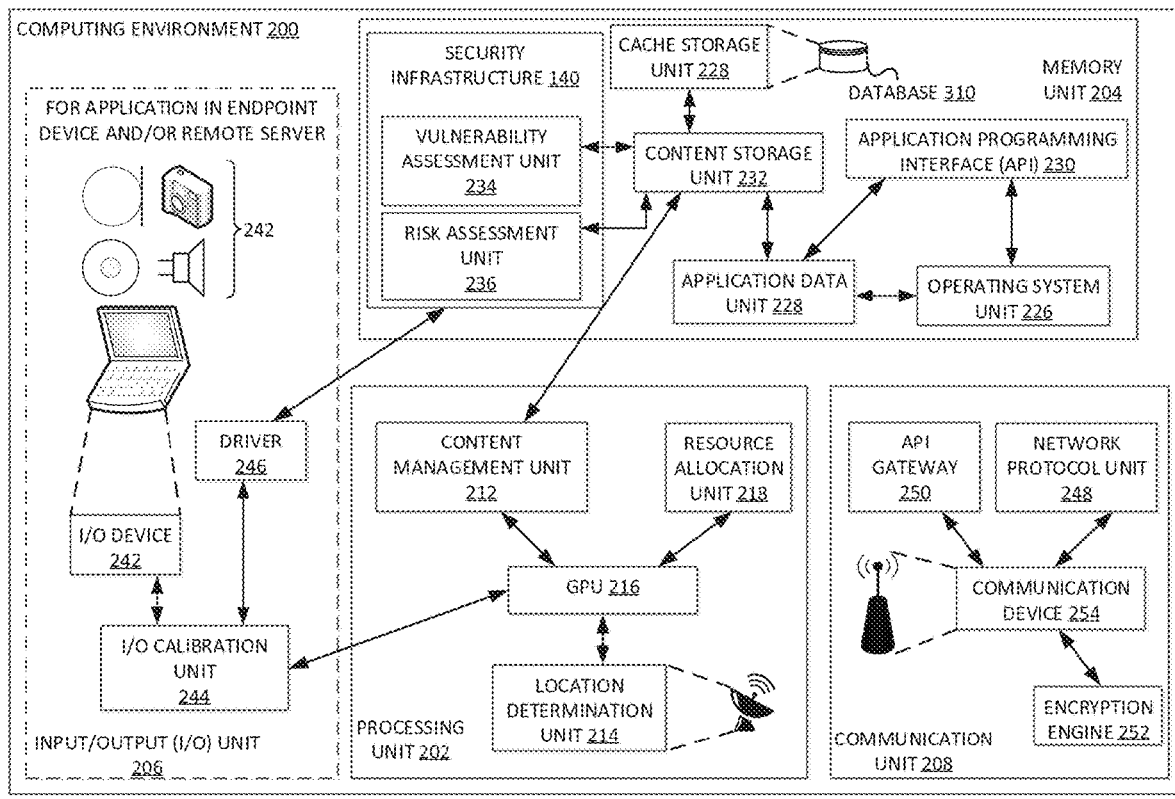
FIG. 3 is a detailed system diagram of a computing environment, in accordance with some embodiments of this disclosure.

In some instances, the server 105 may include various elements of a computing environment as described herein (e.g., computing environment 200 of FIG. 2 and/or FIG. 3). For example, the server 105 may include processing unit 202, a memory unit 204, an input/output (I/O) unit 206, and/or a communication unit 208. The server 105 may further include subunits and/or other instances as described herein for performing operations associated with malware detection and remediation. A user (e.g., network administrator) may operate the server 105 either locally or remotely as the case may be. Further, the server 105 may include a web server 115, security infrastructure 140, and a web and agent resources 160. The web server 115, the security infrastructure 140 and the web and agent resources 160 may be coupled to each other and to the network 110 via one or more signal lines. The one or more signal lines may be a wired and/or a wireless connection. The web server 115 may include a secure socket layer (SSL) proxy 145 for establishing HTTP-based connectivity 150 between the server 105 and other devices coupled to the network 110. Other forms of secure connection techniques, such as encryption, may be employed on the web server 115 and across the network 110. Additionally, the web server 115 may deliver artifacts (e.g., binary code, instructions, etc.) to the security infrastructure 140 either directly via the SSL proxy 145 and/or via the network 110. Additionally, the web and agent resources 160 of the server 105 may be provided to the endpoint device 125 via the web app 165 on the web server 115. The web and agent resources 160 may be used to render a web-based graphical interface (GUI) 170 via the browser 155 running on the endpoint device 125.

The security infrastructure 140 may either be on the server 105 and/or on the endpoint device 125 and or other network system 130 of the system 100. Security infrastructure 140 may include one or more computer security products such as access control software, anti-keyloggers, anti-malware, anti-spyware, anti-subversion software, anti-tamper software, antivirus software, cryptographic software, computer-aided dispatch (CAD) applications, Firewall (web or otherwise), Intrusion detection systems (IDS), Intrusion prevention systems (IPS), log management software, records management software, Sandboxes (e.g., a secure environment in which various computing processes may be executed), security information management software, security information and event management (STEM) software, anti-theft software, parental control software, cloud-based security protection, and/or the like. In some embodiments, security infrastructure 140 may determine whether scan data is indicative of malware and whether a report indicates that the endpoint device 125 is exposed to vulnerabilities (e.g., system vulnerabilities) and risks (e.g., system risk) associated with the network. The report may include a listing of identified attributes of the risks and/or vulnerabilities, a count of identified attributes, a type of each identified attribute, an identification of each malware family and/or a malware variant determined to be associated with the devices coupled to the network 110. The security infrastructure 140 may also provide one or more recommendations for addressing detected vulnerabilities and risks. This record, logs, or reports generated by the security infrastructure 140 may be stored on the local record repository 103 and/or on the public record repository 113.

The security infrastructure 140 may be configured to execute security operations including preparedness operations such as processes for dealing with security incidents/breaches/compromises; detection and analysis operations such as identifying and investigating suspicious activity associated with security events; containment, eradication, and recovery operations including determining the nature of a security event; and post incident activity.

In some further embodiments, the security infrastructure 140 may access an operating system 180 of the endpoint device 125 in order to execute security operations as discussed elsewhere in this disclosure. For instance, the security infrastructure 140 may gain access into the operating system in order to scan a security posture of the endpoint device 125 by scanning a system configuration 185, a file system 190, and/or system services 195 of the endpoint device 125. The plug-in 175 of the web browser 155 may provide needed downloads that facilitate operations executed by the operating system 180, the security infrastructure 140, and/or other applications running on the endpoint device 125.

In some cases, the security infrastructure 140 may be used to determine the vulnerability and/or risk of one or more devices coupled to the network 110, quantitatively characterize and or qualitatively characterize the identified vulnerability and/or risk in the network 110. The security infrastructure 140 may also be used to recommend (e.g., automatically recommend) security actions or operations that mitigate against identified risks and/or vulnerabilities associated with the network 100. In some cases, the security infrastructure 140 may be used to prioritize, sequence, or otherwise order remediation operations against identified risks and/or vulnerabilities. It is appreciated that a system vulnerability (or simply vulnerability) associated with the system 100 may include a security weakness in any hardware device in the system 100, a security weakness in any software being executed in the system 100, and/or a security weakness in any procedures and/or routines being executed on a device in the system 100. It is further appreciated that a security threat may exploit a vulnerability or weakness in the system 100. Moreover, a system risk or a security risk (or simply risk) associated with a network may include the potential for loss (e.g., deactivation of system, loss of system services, loss of system activity, etc.) of any device in the system 100, the potential for damage to any device within the system 100, and/or the potential for destruction of any device within the system 100.

The network 110 may include a plurality of networks. For instance, the network 110 may include any wired and/or wireless communication network that facilitates communication between the server 105, the public record repository 113, and the endpoint device 125. The network 110, in some instances, may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a laser-based network, and/or the like.

Returning to FIG. 1, the public record repository 113 may be one or more storage devices that store data, information and instructions used by the server 105 and the endpoint device 125. The stored information may include information about users, information about threat-actors, information about techniques, tactics and practices used by threat-actors to execute an attack campaign, recommendations for remediation against an attack campaign or a risk or a vulnerability, and other computer security information from multiple devices coupled to the network 110. In one embodiment, the computer security information may be captured from computing devices from multiple different networks other than network 110 and stored in the public record repository 113. In other embodiments, the computer security information stored in the public record repository 113 may be structured into a framework based on real-world trends of attacks on computing devices across the globe. In some instances, this framework can provide comprehensive methods that look into tools/resources/components used by threat-actors to execute an attack campaign on a computing system.

The one or more storage devices mentioned above in association with the public record repository 113 can be non-volatile memory or similar permanent storage device and media. For example, the one or more storage devices may include a hard disk drive, a floppy disk drive, a CD-ROM device, a DVD-ROM device, a DVD-RAM device, a DVD-RW device, a flash memory device, solid state media, or some other mass storage device known in the art for storing information on a more permanent basis.

While the public record repository 113 is shown as coupled to the server 105 and the endpoint device 125 via the network 110, the data in the public record repository 113 may be replicated, in some embodiments, on the server 105 and/or the endpoint device 125. That is to say that a local copy of the data in the public record repository 113 may be stored on the server 105 and/or the endpoint device 125. This local copy may be synched with the public record repository 113 so that when there are any changes to the information in the public record repository 113, the local copy is also accordingly updated in real-time or in near-real-time to be consistent with the information in the public record repository 113.

Turning back to FIG. 1, the endpoint device 125 may be a handheld computing device, a smart phone, a tablet, a laptop computer, a desktop computer, a personal digital assistant (PDA), a smart watch, a wearable device, a biometric device, an implanted device, a camera, a video recorder, an audio recorder, a touchscreen, a computer server, a virtual server, a virtual machine, and/or a video communication server. In some embodiments, the endpoint device 125 may include a plurality of computing devices configured to communicate with one another and/or implement the techniques described herein.

The local record repository 103, shown in association with the endpoint device 125, may be one or more storage devices that store data, information, and instructions used by the endpoint device 125 and/or other devices coupled to the network 110. The stored information may include various logs/records associated with captured security data/security events by the security infrastructure 140. For example, the various reports, logs, data, etc., generated by the one or more security products of the security infrastructure 140 may be stored in the local record repository.

The one or more storage devices discussed above in association with the local record repository 103 may be non-volatile memory or similar permanent storage device and media. For example, the one or more storage devices may include a hard disk drive, a floppy disk drive, a CD-ROM device, a DVD-ROM device, a DVD-RAM device, a DVD-RW device, a flash memory device, solid state media, or some other mass storage device known in the art for storing information on a more permanent basis.

The other elements of the endpoint device 125 are discussed in association with the computing environment 200 of FIG. 2 and/or FIG. 3. For example, elements such as a processing unit 202, a memory unit 204, an input/output (I/O) unit 206, and/or a communication unit 208 may execute one or more of the modules of endpoint device 125 and/or one or more elements of the server 105 shown in FIG. 1. The endpoint device 125 may also include subunits and/or other computing instances as described herein for performing operations associated with malware detection, risk characterizations, vulnerability characterizations, mitigating against risks and vulnerabilities, malware remediation, etc. Network systems 130a . . . 130n may include devices such as a hub, a switch, a router, a bridge, a gateway, a modem, a repeater, an access point, access point, a smart device, a computing device, etc.

FIG. 2 and FIG. 3 illustrate exemplary functional and system diagrams of a computing environment 200, according to some embodiments of this disclosure, for performing the operations described herein. Specifically, FIG. 2 provides a functional block diagram of the computing environment 200, whereas FIG. 3 provides a detailed system diagram of the computing environment 200. It is appreciated that the computing environment 200 may be implemented in in one or more elements of the system 100 such as the endpoint device 125, the server 105, the network systems 130a . . . 130n, the network 110, and the public record repository 113.

As seen in FIG. 2 and FIG. 3, the computing environment 200 may include a processing unit 202, a memory unit 204, an I/O unit 206, and a communication unit 208. The processing unit 202, the memory unit 204, the I/O unit 206, and the communication unit 208 may include one or more subunits for performing operations described herein. Additionally, each unit and/or subunit may be operatively and/or otherwise communicatively coupled with each other so as to facilitate the operations described herein. The computing environment 200 including any of its units and/or subunits may include general hardware, specifically-purposed hardware, and/or software.

The computing environment 200 and any units and/or subunits of FIG. 2 and/or FIG. 3 may be included in one or more elements of system 100 as described with reference to FIG. 1. For example, one or more elements (e.g., units and/or subunits) of the computing environment 200 may be included in the server 105 and/or the endpoint device 125.

The processing unit 202 may control one or more of the memory unit 204, the I/O unit 206, and the communication unit 208 of the computing environment 200, as well as any included subunits, elements, components, devices, and/or functions performed by the memory unit 204, I/O unit 206, and the communication unit 208. The described sub-elements of the computing environment 200 may also be included in similar fashion in any of the other units and/or devices included in the system 100 of FIG. 1. Additionally, any actions described herein as being performed by a processor may be taken by the processing unit 202 of FIG. 2 and/or FIG. 3 alone and/or by the processing unit 202 in conjunction with one or more additional processors, units, subunits, elements, components, devices, and/or the like. Further, while one processing unit 202 may be shown in FIG. 2 and/or FIG. 3, multiple processing units may be present and/or otherwise included in the computing environment 200 or elsewhere in the overall system (e.g., system 100 of FIG. 1). Thus, while instructions may be described as being executed by the processing unit 202 (and/or various subunits of the processing unit 202), the instructions may be executed simultaneously, serially, and/or otherwise by one or multiple processing units 202 on one or more devices.

In some embodiments, the processing unit 202 may be implemented as one or more computer processing unit (CPU) chips and/or graphical processing unit (GPU) chips and may include a hardware device capable of executing computer instructions. The processing unit 202 may execute instructions, codes, computer programs, and/or scripts. The instructions, codes, computer programs, and/or scripts may be received from and/or stored in the memory unit 204, the I/O unit 206, the communication unit 208, subunits, and/or elements of the aforementioned units, other devices, and/or computing environments, and/or the like.

In some embodiments, the processing unit 202 may include, among other elements, subunits such as a content management unit 212, a location determination unit 214, a graphical processing unit (GPU) 216, and a resource allocation unit 218. Each of the aforementioned subunits of the processing unit 202 may be communicatively and/or otherwise operably coupled with each other.

The content management unit 212 may facilitate generation, modification, analysis, transmission, and/or presentation of content. Content may be file content, media content, malware content, or any combination thereof. In some instances, content on which the content management unit 212 may operate includes device information, user interface data, images, text, themes, audio files, video files, documents, and/or the like. Additionally, the content management unit 212 may control the audio-visual environment and/or appearance of application data during execution of various processes (e.g., via web GUI 170 at the endpoint device 125). In some embodiments, the content management unit 212 may interface with a third-party content server and/or memory location for execution of its operations.

The location determination unit 214 may facilitate detection, generation, modification, analysis, transmission, and/or presentation of location information. Location information may include global positioning system (GPS) coordinates, an Internet protocol (IP) address, a media access control (MAC) address, geolocation information, a port number, a server number, a proxy name and/or number, device information (e.g., a serial number), an address, a zip code, and/or the like. In some embodiments, the location determination unit 214 may include various sensors, radar, and/or other specifically-purposed hardware elements for the location determination unit 214 to acquire, measure, and/or otherwise transform location information.

The GPU 216 may facilitate generation, modification, analysis, processing, transmission, and/or presentation of content described above, as well as any data (e.g., scanning instructions, scan data, and/or the like) described herein. In some embodiments, the GPU 216 may be utilized to render content for presentation on a computing device (e.g., via web GUI 170 at the endpoint device 125). The GPU 216 may also include multiple GPUs and therefore may be configured to perform and/or execute multiple processes in parallel. In some implementations, the GPU 216 may be used in conjunction with the vulnerability assessment unit 234, the risk assessment unit 236, and/or other subunits associated with the memory unit 204, the I/O unit 206, the communication unit 208, and/or a combination thereof.

The resource allocation unit 218 may facilitate the determination, monitoring, analysis, and/or allocation of computing resources throughout the computing environment 200 and/or other computing environments. For example, the computing environment may facilitate a high volume of data (e.g., files, malware, malware variants, etc.), to be processed and analyzed. As such, computing resources of the computing environment 200 utilized by the processing unit 202, the memory unit 204, the I/O unit 206, and/or the communication unit 208 (and/or any subunit of the aforementioned units) such as processing power, data storage space, network bandwidth, and/or the like may be in high demand at various times during operation. Accordingly, the resource allocation unit 218 may include sensors and/or other specially-purposed hardware for monitoring performance of each unit and/or subunit of the computing environment 200, as well as hardware for responding to the computing resource needs of each unit and/or subunit. In some embodiments, the resource allocation unit 218 may use computing resources of a second computing environment separate and distinct from the computing environment 200 to facilitate a desired operation.

For example, the resource allocation unit 218 may determine a number of simultaneous computing processes and/or requests. The resource allocation unit 218 may also determine that the number of simultaneous computing processes and/or requests meets and/or exceeds a predetermined threshold value. Based on this determination, the resource allocation unit 218 may determine an amount of additional computing resources (e.g., processing power, storage space of a particular non-transitory computer-readable memory medium, network bandwidth, and/or the like) required by the processing unit 202, the memory unit 204, the I/O unit 206, the communication unit 208, and/or any subunit of the aforementioned units for safe and efficient operation of the computing environment while supporting the number of simultaneous computing processes and/or requests. The resource allocation unit 218 may then retrieve, transmit, control, allocate, and/or otherwise distribute determined amount(s) of computing resources to each element (e.g., unit and/or subunit) of the computing environment 200 and/or another computing environment.

In some embodiments, factors affecting the allocation of computing resources by the resource allocation unit 218 may include the number of computing processes and/or requests, a duration of time during which computing resources are required by one or more elements of the computing environment 200, and/or the like. In some implementations, computing resources may be allocated to and/or distributed amongst a plurality of second computing environments included in the computing environment 200 based on one or more factors mentioned above. In some embodiments, the allocation of computing resources of the resource allocation unit 218 may include the resource allocation unit 218 flipping a switch, adjusting processing power, adjusting memory size, partitioning a memory element, transmitting data, controlling one or more input and/or output devices, modifying various communication protocols, and/or the like. In some embodiments, the resource allocation unit 218 may facilitate utilization of parallel processing techniques such as dedicating a plurality of GPUs included in the processing unit 202 for running a multitude of processes.

The memory unit 204 may be utilized for storing, recalling, receiving, transmitting, and/or accessing various files and/or data (e.g., malware files, malware samples, scan data, and/or the like) during operation of computing environment 200. For example, memory unit 204 may be utilized for storing, recalling, and/or updating scan history information as well as other data associated with, resulting from, and/or generated by any unit, or combination of units and/or subunits of the computing environment 200. In some embodiments, the memory unit 204 may store instructions, code, and/or data that may be executed by the processing unit 201. For instance, the memory unit 204 may store code that execute operations associated with one or more units and/or one or more subunits of the computing environment 200. For example, the memory unit may store code for the processing unit 202, the I/O unit 206, the communication unit 208, and for itself.

Memory unit 204 may include various types of data storage media such as solid state storage media, hard disk storage media, virtual storage media, and/or the like. Memory unit 204 may include dedicated hardware elements such as hard drives and/or servers, as well as software elements such as cloud-based storage drives. In some implementations, memory unit 204 may be a random access memory (RAM) device, a dynamic random access memory (DRAM) device, a static random access memory (SRAM) device, flash memory, read only memory (ROM) device, and/or various forms of secondary storage. The RAM device may be used to store volatile data and/or to store instructions that may be executed by the processing unit 202. For example, the instructions stored by the RAM device may be a command, a current operating state of computing environment 200, an intended operating state of computing environment 200, and/or the like. As a further example, data stored in the RAM device of memory unit 204 may include instructions related to various methods and/or functionalities described herein. The ROM device may be a non-volatile memory device that may have a smaller memory capacity than the memory capacity of a secondary storage. The ROM device may be used to store instructions and/or data that may be read during execution of computer instructions. In some embodiments, access to both the RAM device and ROM device may be faster to access than the secondary storage.

Secondary storage may comprise one or more disk drives and/or tape drives and may be used for non-volatile storage of data or as an over-flow data storage device if the RAM device is not large enough to hold all working data. Secondary storage may be used to store programs that may be loaded into the RAM device when such programs are selected for execution. In some embodiments, the memory unit 204 may include one or more databases 310 (shown in FIG. 3) for storing any data described herein. For example, depending on the implementation, the one or more databases may be used as the local record repository 103 of the endpoint device discussed with reference to FIG. 1. Additionally or alternatively, one or more secondary databases (e.g., the public record repository 113 discussed with reference to FIG. 1) located remotely from computing environment 200 may be utilized and/or accessed by memory unit 204. In some embodiments, memory unit 204 and/or its subunits may be local to the server 105 and/or the endpoint device 125 and/or network systems 130a . . . 130n and/or remotely located in relation to the server 105 and/or the endpoint device 125 and/or network systems 130a . . . 130n.

Turning back to FIG. 2, the memory unit 204 may include subunits such as an operating system unit 226, an application data unit 228, an application programming interface 230, a content storage unit 232, security infrastructure 140, and a cache storage unit 240. Each of the aforementioned subunits of the memory unit 204 may be communicatively and/or otherwise operably coupled with each other and other units and/or subunits of the computing environment 200. It is also noted that the memory unit 204 may include other modules, instructions, or code that facilitate the execution of the techniques described herein. For instance, the memory unit 204 may include one or more modules such as a receiving module, a mapping module, a determining module, a sequencing module, a quantifying module, a resolving module, a parsing module, a visualization module, etc., that comprise instructions executable by one or more computing device processors to accomplish the steps in the flowcharts of FIG. 4 and FIG. 5.

The operating system unit 226 may facilitate deployment, storage, access, execution, and/or utilization of an operating system utilized by computing environment 200 and/or any other computing environment described herein. In some embodiments, operating system unit 226 may include various hardware and/or software elements that serve as a structural framework for processing unit 202 to execute various operations described herein. Operating system unit 226 may further store various pieces of information and/or data associated with the operation of the operating system and/or computing environment 200 as a whole, such as a status of computing resources (e.g., processing power, memory availability, resource utilization, and/or the like), runtime information, modules to direct execution of operations described herein, user permissions, security credentials, and/or the like.

The application data unit 228 may facilitate deployment, storage, access, execution, and/or utilization of an application utilized by computing environment 200 and/or any other computing environment described herein. For example, the endpoint device 125 may be required to download, install, access, and/or otherwise utilize a software application (e.g., web application 165) to facilitate performance of malware scanning operations. As such, application data unit 228 may store any information and/or data associated with an application. Application data unit 228 may further store various pieces of information and/or data associated with the operation of an application and/or computing environment 200 as a whole, such as a status of computing resources (e.g., processing power, memory availability, resource utilization, and/or the like), runtime information, user interfaces, modules to direct execution of operations described herein, user permissions, security credentials, and/or the like.

The application programming interface (API) unit 230 may facilitate deployment, storage, access, execution, and/or utilization of information associated with APIs of computing environment 200 and/or any other computing environment described herein. For example, computing environment 200 may include one or more APIs for various devices, applications, units, subunits, elements, and/or other computing environments to communicate with each other and/or utilize the same data. Accordingly, API unit 230 may include API databases containing information that may be accessed and/or utilized by applications, units, subunits, elements, and/or operating systems of other devices and/or computing environments. In some embodiments, each API database may be associated with a customized physical circuit included in memory unit 204 and/or API unit 230. Additionally, each API database may be public and/or private, and so authentication credentials may be required to access information in an API database. In some embodiments, the API unit 230 may enable the server 105 and the endpoint device 125 to communicate with each other.

The content storage unit 232 may facilitate deployment, storage, access, and/or utilization of information associated with performance of malware scanning operations and/or framework processes by computing environment 200 and/or any other computing environment described herein. In some embodiments, content storage unit 232 may communicate with content management unit 212 to receive and/or transmit content files (e.g., media content).

Security infrastructure 140 may include at least a vulnerability assessment unit 234 and a risk assessment unit 236. The vulnerability assessment unit 234 may store instructions associated with one or more security products of security infrastructure 140 that facilitate the detection of threats posed by threat actors. For example, the vulnerability assessment unit 234 and/or the risk assessment unit may store instructions associated with access control software, anti-keyloggers, anti-malware, anti-spyware, anti-subversion software, anti-tamper software, antivirus software, cryptographic software, computer-aided dispatch (CAD), Firewall (web or otherwise), Intrusion detection systems (IDS), Intrusion prevention systems (IPS), log management software, records management software, Sandboxes (e.g., a secure environment in which various computing processes may be executed), security information management, security information and event management (STEM) software, anti-theft software, parental control software, cloud-based security protection, and/or the like.

Moreover, the vulnerability assessment unit 234 may include instructions that when executed, facilitate the determination of one or more vulnerabilities associated with one or more devices of the system 100 based on data from the security infrastructure 140. In addition, the vulnerability assessment unit 234 may also include instructions that when executed by the processing unit 202, for example, facilitate remediation operations that mitigate against detected vulnerabilities in the system 100. The risk assessment unit 236 may facilitate deployment, storage, access, analysis, and/or utilization of scan data received during a scan of one or more devices coupled to the network 110. For example, risk assessment unit 236 may store information associated with each operation that involves file scanning, malware file execution, malware detection, and or the other operations executed by security products of security infrastructure 140 and determine risks posed to the network based on the reports generated from the various operations of the security infrastructure 140. Information stored in risk assessment 236 may be used by the content management unit 212, GPU unit 216, the vulnerability assessment unit 234, and/or other units and/or subunits of computing environment 200. It should be understood that information generated by or associated with the vulnerability unit 234 and/or risk assessment unit 236 may be stored in the local record repository 103 and/or the public record repository.

The cache storage unit 240 may facilitate short-term deployment, storage, access, analysis, and/or utilization of data. In some embodiments, cache storage unit 240 may serve as a short-term storage location for data so that the data stored in cache storage unit 240 may be accessed quickly. In some instances, cache storage unit 240 may include RAM devices and/or other storage media types for quick recall of stored data. Cache storage unit 240 may include a partitioned portion of storage media included in memory unit 204.

The I/O unit 206 may include hardware and/or software elements for the computing environment 200 to receive, transmit, and/or present information useful for performing malware scanning operations and/or other processes as described herein. For example, elements of the I/O unit 206 may be used to receive input from a user of the endpoint device 125. As described herein, I/O unit 206 may include subunits such as an I/O device 242, an I/O calibration unit 244, and/or driver 246.

The I/O device 242 may facilitate the receipt, transmission, processing, presentation, display, input, and/or output of information as a result of executed processes described herein. In some embodiments, the I/O device 242 may include a plurality of I/O devices. In some embodiments, I/O device 242 may include a variety of elements that enable a user to interface with computing environment 200. For example, I/O device 242 may include a keyboard, a touchscreen, a button, a sensor, a biometric scanner, a laser, a microphone, a camera, and/or another element for receiving and/or collecting input from a user. Additionally and/or alternatively, I/O device 242 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 242 may communicate with one or more elements of processing unit 202 and/or memory unit 204 to execute operations associated with malware scanning, detection, displaying visual representations of attack steps used in attack campaigns associated with the malware scanning and detections, displaying visual representations of remediation strategies against an attack campaign, and other operations described herein.

The I/O calibration unit 244 may facilitate the calibration of the I/O device 242. For example, I/O calibration unit 244 may detect and/or determine one or more settings of I/O device 242, and then adjust and/or modify settings so that the I/O device 242 may operate more efficiently.

In some embodiments, I/O calibration unit 244 may utilize a driver 246 (or multiple drivers) to calibrate I/O device 242. For example, driver 246 may include software that is to be installed by I/O calibration unit 244 so that an element of computing environment 200 (or an element of another computing environment) may recognize and/or integrate with I/O device 242 for the malware scanning operations and/or framework processes described herein.

The communication unit 208 may facilitate establishment, maintenance, monitoring, and/or termination of communications between computing environment 200 and other computing environments, third party server systems, and/or the like (e.g., between the server 105 and the endpoint device 125). Communication unit 208 may also facilitate internal communications between various elements (e.g., units and/or subunits) of computing environment 200. In some embodiments, communication unit 208 may include a network protocol unit 248, an API gateway 250, an encryption engine 252, and/or a communication device 254. Communication unit 208 may include hardware and/or software elements.

The network protocol unit 248 may facilitate establishment, maintenance, and/or termination of a communication connection for computing environment 200 by way of a network. For example, network protocol unit 248 may detect and/or define a communication protocol required by a particular network and/or network type. Communication protocols utilized by network protocol unit 248 may include Wi-Fi protocols, Li-Fi protocols, cellular data network protocols, Bluetooth® protocols, WiMAX protocols, Ethernet protocols, powerline communication (PLC) protocols, and/or the like. In some embodiments, facilitation of communication for computing environment 200 may include transforming and/or translating data from being compatible with a first communication protocol to being compatible with a second communication protocol. In some embodiments, network protocol unit 248 may determine and/or monitor an amount of data traffic to consequently determine which particular network protocol is to be used for establishing a secure communication connection, transmitting data, and/or performing malware scanning operations and/or other processes described herein.

The application programming interface (API) gateway 250 may facilitate other devices and/or computing environments to access API unit 230 of memory unit 204 of computing environment 200. For example, an endpoint device 125 may access API unit 230 of computing environment 200 via API gateway 250. In some embodiments, API gateway 250 may be required to validate user credentials associated with a user of an endpoint device prior to providing access to API unit 230 to a user. API gateway 250 may include instructions for computing environment 200 to communicate with another device and/or between elements of the computing environment 200.

The encryption engine 252 may facilitate translation, encryption, encoding, decryption, and/or decoding of information received, transmitted, and/or stored by the computing environment 200. Using encryption engine 252, each transmission of data may be encrypted, encoded, and/or translated for security reasons, and any received data may be encrypted, encoded, and/or translated prior to its processing and/or storage. In some embodiments, encryption engine 252 may generate an encryption key, an encoding key, a translation key, and/or the like, which may be transmitted along with any data content.

The communication device 254 may include a variety of hardware and/or software specifically purposed to facilitate communication for computing environment 200. In some embodiments, communication device 254 may include one or more radio transceivers, chips, analog front end (AFE) units, antennas, processing units, memory, other logic, and/or other components to implement communication protocols (wired or wireless) and related functionality for facilitating communication for computing environment 200. Additionally and/or alternatively, communication device 254 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

Asset Risk Assessment

Figure 4:
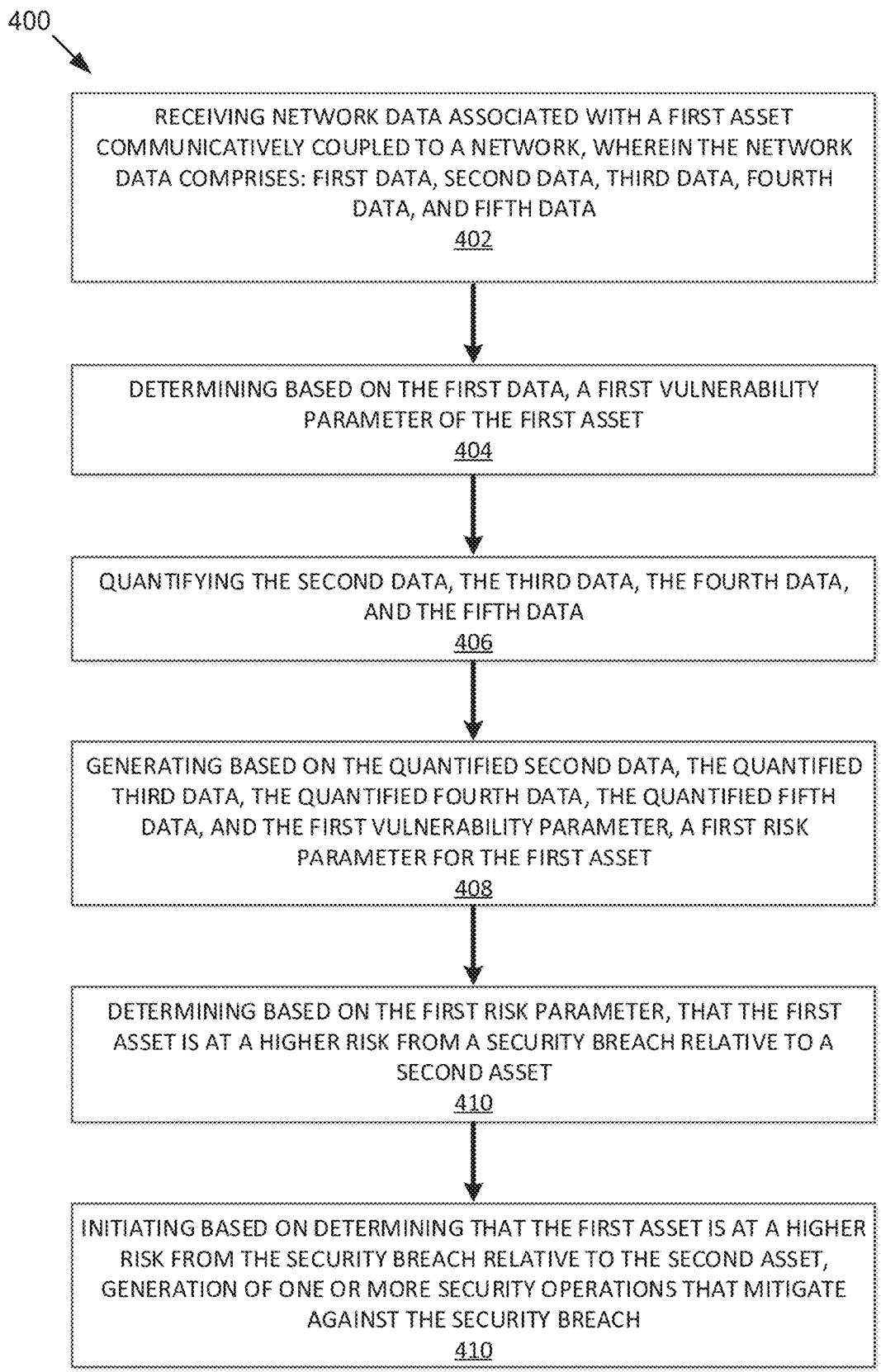
FIG. 4 shows an example flowchart 400 for determining risk associated with an asset communicatively coupled to a network in accordance with some embodiments of this disclosure.

FIG. 4 shows an example flowchart 400 for determining risk associated with an asset communicatively coupled to a network. At block 402, one or more computing device processors (e.g., processing unit 202) may receive network data associated with a first asset communicatively coupled to a network. The network data may comprise first data associated with criticality information of the network, second data associated with configuration information of the network, third data associated with malware information associated of the network, fourth data associated with a software cycle information of the network, and fifth data associated with location information of the network. In one embodiment, the first data is associated with the quantified criticality of one or more assets communicatively coupled to the network. The second data, in some embodiments, is associated with configuration or misconfiguration and/or quantified vulnerabilities associated with one or more assets coupled to the network. The third data may be associated with evidence of malware or malware data detected on or more assets communicatively coupled to the network. In some cases, the fourth data is associated with a presence of end-of-life software and/or hardware available or otherwise associated with one or more assets communicatively coupled to the network. The fifth data may be associated with the location of one or more assets communicatively coupled to the network. For example, the network data may be received using one or more computing device processors associated with the server 105, endpoint device 125, one or more network systems 130a . . . 130n, and/or other computing device processors coupled to the network 110 of FIG. 1. In one embodiment, the one or more computing device processors may execute instructions associated with/or in cooperation with security infrastructure 140 to capture the network data using one or more of the security infrastructure's security products or some other security software or application running on a computing system of the system 100. The captured network data may be logged into a database (e.g., local record repository 103, public record repository 113, etc.) by the one or more computing device processors. For instance, the security infrastructure 140 may capture the network data and log same into a log such as an antivirus log, a web application firewall log, an intrusion prevention system log, an intrusion detection system log, a web server log, an operating system log, etc. In some implementations, other data associated with the network may also be captured and logged such as a time stamp for each recorded security event, one or more identifiers for each security event, specific assets information (i.e., hardware and/or software resources) of devices within the network, etc.

In some implementations, the network data may comprise security events associated with: infrastructure security operations; cloud security operations including real-time protection of cloud data; compliance security operations including monitoring and managing third parties using data associated with a centralized computing device (e.g., endpoint device 125, server 105, etc.); network security operations such as discovering, tracking and protecting assets coupled to a network associated with a computing device within the network; DevOps operations such as flagging intrusions associated with software development and information technology operations; etc. In some implementations, the network data may further comprise a passive attack event including one or more security detections of reconnaissance activities of a threat-actor to obtain vulnerability information of a computing device/system coupled to a network. The network data may further comprise one or more security detections associated with intrusion activity on a computing device of the network. Intrusion activity may include any malicious activity and/or any violation of policy associated risks and vulnerabilities of the network.

In other embodiments, the network data may be associated with, or tied to physical structures such as buildings, rooms, offices, labs, or the like, within which a computing device or computing system, and/or a computing network is implemented. In such implementations, the physical structure or building may include access control mechanisms coupled to the network for tracking access to the physical structure in question, and/or for recording/logging identities of individuals gaining access to the physical structure in question, and/or for detecting unauthorized access to the physical structure in question, and/or for preventing physical access to the physical structure in question.

Turning back to block 404 of flowchart 400, one or more computing device processors may determine based on the first data, a first vulnerability parameter of the first asset. The criticality information of the network may parameterize the first vulnerability parameter of the first asset. In some embodiments, the parameterizing of the first vulnerability parameter may be manually executed by a network administrator or a security expert by providing values that configure or otherwise set a criticality value for the first asset. In some embodiments, criticality information needed to parameterize the first parameter may be retrieved from the repository (e.g., local record repository 103 or public record repository 113). In such cases, parameterizing the first vulnerability parameter may comprise automatically mapping assets of the network to the criticality information in the repository. In some instances, parameterizing the first vulnerability parameter may include automatically determining, using one or more computing device processors, the criticality of the first asset or multiple assets of the network by analyzing different hardware and/or software artifacts found on the first asset or other assets of the network. For example, the analysis could include logic that determine whether the first asset (or other assets, systems, or devices or the system 100) host entity (e.g., organization, company) related software (.e.g. company employee data, payroll data, databases, etc.). In some cases, the analysis includes determining whether the first asset or other assets of the network 110 fall under a compliance scope (e.g., Payment Card Industry (PCI) Data Security Standard, Health Insurance Portability and Accountability Act (HIPAA), etc.). The analysis could also include determining a hardware profile (e.g., processor information, memory information, connectivity information) of the first asset or other assets of the network. In some implementations, parameterizing the first vulnerability parameter using the criticality information may include generating the first vulnerability parameter using metric groups classified under base categories, temporal categories, and environmental categories that refer to various aspects of vulnerabilities associated with the network (e.g., network 110). In some embodiments, parameterizing the first vulnerability parameter may comprise using the Common Vulnerability Scoring System (CVSS) to determine a value or magnitude for the first vulnerability parameter.

One or more computing device processors may, at block 406, quantify the second data, the third data, the fourth data, and the fifth data comprised in the network data. In some embodiments, the first data may indicate at least one of: an asset type for the first asset communicatively coupled; and usage data of the first asset communicatively coupled to the network relative to usage data of a second asset communicatively coupled to the network. The asset type may indicate whether the first asset: is a production system comprised in a plurality of systems communicatively coupled to the network; is a system hosting a production system communicatively coupled to the network; is a system hosting a production database communicatively coupled to the network; is an internal system that is not visible to entities outside the network; or is an internal system for testing and development computing operations on the network.

At block 408, the one or more computing device processors may generate, using the one or more computing device processors and based on the quantified second data, the quantified third data, the quantified fourth data, the quantified fifth data, and the first vulnerability parameter, a first risk parameter for the first asset, wherein the first risk parameter indicates an exploitability assessment of the first asset communicatively coupled to the network relative to an exploitability assessment of a second asset communicatively coupled to the network within a first time window. In one embodiment, the exploitability assessment indicates varying degrees to which the first asset, the second asset or other assets (e.g., devices in system 100) may be attacked or otherwise exposed to security breaches from threat-actors. The exploitability assessment may include an evaluation of the extent to which one or more assets of the network are susceptible to potential loss, damage, destruction, attacks from threat actors, etc. According to one implementation, the first risk parameter comprises an asset risk score for the first asset or an asset risk score for the second asset or an asset risk score for multiple assets of the system 100. This asset risk score may be generated for the first asset of the network using the following relationship:

Asset Risk Score=Asset Criticality Score×(Max (weighted average of vulnerabilities, weighted average of misconfigurations, Max(malware detection score, weighted average of end-of-life (eol) detections))×Weight of the asset location (internal/external)

Weighted average of vulnerabilities=$wc$(Avg (QDSc))+$wh$(Avg(QDSh))+$wm$(Avg(QDSm))+$wl$ (Avg(QDSl))

Weighted average of misconfigurations=$w$(Avg(Urgent))+$w$(Avg(Critical))+$w$(Avg(serious))+$w$(Avg (medium))+$w$(Avg(minimal))

Max(malware detection score)=Max of malware detections found on the system

Weighted average of eol detections=Weighted average of end-of-life software found on the system where $w$=weight, $wc$=weight of critical severe vulnerabilities, $wh$=weight of high severity, $wm$=weight of medium severe vulnerabilities, $wl$=weight of low severe vulnerabilities.

At block 410, the one or more computing device processors may determine, based on the first risk parameter, that the first asset is at a higher risk from a security breach relative to the second asset and initiate, based on determining that the first asset is at a higher risk from the security breach relative to the second asset, the generation of one or more security operations that mitigate against the security breach. The one or more security operations may comprise a sequence of operations that at least partially secure the first asset against the security breach.

According to some implementations, the first data is based on one or more of: parameterized criticality data associated with the first asset communicatively coupled to the network, the second asset communicatively coupled to the network, or a third asset communicatively coupled to the network; synchronized system data derived from at least aggregated security logs associated with the first asset communicatively coupled to the network, the second asset communicatively coupled to the network, or the third asset communicatively coupled to the network; software data derived from a first analysis of one or more software being executed using the first asset communicatively coupled to the network, or the second asset communicatively coupled to the network, or the third asset communicatively coupled to the network; and hardware data derived from a second analysis of one more hardware used to implement the first asset communicatively coupled to the network, the second asset communicatively coupled to the network, or the third asset communicatively coupled to the network. In one embodiment, the risk parameter is an aggregate of quantified risks associated with one or more of the first asset communicatively coupled to the network, the second asset communicatively coupled to the network, or the third asset communicatively coupled to the network.

It is appreciated that the vulnerability parameter is correlated with vulnerability data associated with one or more assets communicatively coupled to the network to generate the first risk parameter. It is further appreciated that the configuration information indicates one or more of: a first security configuration data indicating a configuration of one or more software associated with the communicatively coupled to the network or the second asset communicatively coupled to the network; and a second security configuration data indicating a configuration of one or more hardware associated with the communicatively coupled to the network or the second asset communicatively coupled to the network.

Moreover, the malware information comprises malware detection data captured within the network or outside the network while the software cycle information indicates whether one or more software associated with the first asset or associated with the second asset has a new software update available. If the software or the hardware is an end-of-life software/hardware, meaning that there are no new updates or versions of said software/hardware, then it may not receive any updates, hence exposed to higher risk. In addition, the security breach may include one or more attack execution operations against the first asset communicatively coupled to the network or the second asset communicatively coupled to the network. In addition, the location information comprises data indicating: whether the first asset communicatively coupled to the network or the second asset communicatively coupled to the network are located in the same location or are located in disparate location; whether the network is isolated from external networks; or whether the first asset or the second asset are communicatively coupled to the network using a virtual private network (VPN). It is further appreciated that the first asset or the second asset or a third asset includes a computing device such as those discussed in association with the system 100.

System Vulnerability Assessment

FIG. 5 shows an example flowchart for determining vulnerability (e.g., assessing risk of a vulnerability) associated with an asset or system communicatively coupled to a network in accordance with some embodiments of this disclosure. At block 502, one or more computing device processors may receive network data associated with a first system of a network or a second system of the network. The network data may comprise: first data associated with a vulnerability of the first system of the network or the second system of the network; second data associated with substantially real-time security event data associated with the first system of the network or the second system of the network; third data associated with one or more of software code of a first application executed on the first system of the network or the second system of the network and software code of a second application used by a threat-actor to attack the first system of the network or the second system of the network during a first time window; fourth data associated with identification information of the threat-actor; fifth data associated with a malware family used to attack the first system of the network or the second system of the network; sixth data associated with security trend information during the first time window in which the threat-actor attacked the first system of the network or the second system of the network. At 504, the method may quantify, using the one or more computing device processors, the first data, the second data, the third data, the fourth data, the fifth data, and the sixth data. The method may further determine at 506, using the one or more computing device processors, a risk parameter based on the quantifying. The risk parameter may indicate a security posture of the first system or the second system. According to one implementation, the security posture may include an indication of one or more of: a level of visibility of the first asset/system or any asset/system communicatively coupled to the network to an attack; weaknesses in controls or processes associated with the network; response ability of the network in handling an exploited network weakness, etc. In one embodiment, the At 508, the method may generate, using the one or more computing device processors, a vulnerability profile (e.g., vulnerability risk profile) for the first system of the network or the second system of the network based on the risk parameter. The vulnerability profile may indicate one or more a security weakness of the first system or the second system or other weaknesses of the network. At 510, the method may determine, using the one or more computing device processors and based on the security weakness of the first system or the second system, a remediation protocol comprising remediation steps for minimizing the security weakness of the first system of the network or the second system of the network.

It is appreciated that the risk parameter is an aggregate of a first quantified risk of the first system of the network and a second quantified risk of the second system of the network within the first time window or a second time window according to some implementations. Moreover, Flowchart 500 may further comprise resolving the remediation protocol into remediation steps that are sequenced based on the security weakness. Resolving the remediation protocol may comprise arranging the remediation steps in a first order that mitigates against a second order of execution of one or more attack execution operations executed by the threat-actor to attack the first system or the second system.

According to some implementations, the second data comprises susceptibility data associated with an attack type against the first system of the network or the second system of the network. The attack type may be comprised in an attack group that categorizes one or more attacks executed by the threat-actor. The attack type may be selected from the attack group comprising: a phishing attack, a spear phishing attack, a whale phishing attack, a malware attack, a ransomware attack, a drive-by attack, or a Trojan horse attack. The attack type may be selected from the attack group comprising: an Structured Query Language (SQL) injection attack, a cross-site scripting attack, a denial-of-service attack, password attack, a data exfiltration attack, an eavesdropping attack, a brute-force attack, an insider threat attacks, a man-in-the-middle attack, or an AI powered attack.

The third data discussed in association with FIG. 5 may indicate a likelihood of exploiting the first system of the network or the second system of the network based on: an availability of the software code of the first application being executed on the first system of the network or the second system of the network, an availability of the software code of the second application used by the threat-actor to attack the first system of the network or the second system of the network; or an availability of techniques, tactics, or practices that is used to attack the first system of the network or the second system of the network. Moreover, the flowchart of FIG. 5 may further comprise determining whether the vulnerability of the first system of the network or the second system of the network is actively exploited by a malware system or by the threat-actor. Active exploitation may refer to a persistent exploitation during the first time window, or a second time window, or a third time window as the case may be. According to some implementations, the flowchart of FIG. 5 may further include determining an exploit code maturity for the vulnerability of one or more systems (e.g., the first system or first asset) communicatively coupled to the network and generating the vulnerability profile based on the exploit code maturity. The exploit code vulnerability may indicate code or pseudo-code that is weaponized by the threat-actor to exploit the vulnerability of the first system. In some embodiments, the exploit code maturity reflects an assessment that concepts or proof-of-concepts that describe a previously untested attack approach is incorporated into code or pseudocode by a threat-actor and used to execute one or more attack execution operations associated on one or more systems communicatively coupled to the network. In one embodiment, the exploit code maturity could be a Proof-Of-Concept (PoC) which indicates that a possible exploit against a system communicatively coupled to the asset exists, but it may or may not work against one or more systems communicatively coupled to the network. The exploit code maturity could also be assessed to be weaponized, in which case the exploit code is very mature and can be easily used to compromise or exploit one or more systems communicatively coupled to the network. In one embodiment, a PoC exploit code maturity could be quantified or otherwise rated higher relative to other exploit code maturity assessments of one or more systems communicatively coupled to the asset. In addition, the first time window may indicate a first duration within which the vulnerability of the first system of the network or the second system of the network is actively exploited such that security events associated with the network are captured and logged during the first duration.

It is appreciated that the identification information comprises information associated with one or more of: an Advanced Persistent Threat (APT) group; a ransomware threat group; Script Kiddies; White Hat hackers; Black Hat hackers; Grey Hat hackers; Green Hat hackers; Red Hat hackers; or Blue Hat hackers. Furthermore, the risk parameter indicate a quantified trend metric indicating an attack trend against the first system of the network or the second system of the network based on a vulnerability or weakness associated with the first system or second system.

Flowchart 500 may further comprise: determining a first risk metric for the first system of the network based on at least the first data, the second data, the third data, the fourth data, the fifth data or the sixth data; determining a second risk metric for the second system of the network based on at least the first data, the second data, the third data, the fourth data, the fifth data or the sixth data; and computing the risk parameter using the first risk metric and the second risk metric, wherein the first risk metric is greater in magnitude than the second risk metric. According to one embodiment, the remediation protocol may include a first remediation operation for minimizing the security weakness based on the first risk metric for the first system, and a second remediation operation for reducing the system security risk based on the second risk metric for the first system. The first remediation operation may prioritized over the second remediation operation.

Furthermore, the sixth data may be associated with security trend information during the first time window in which the threat-actor attacked the first system of the network or the second system of the network, or a third system not coupled to the network. In such cases, security trend information from entities similar to or different from the entity within which the network is implemented may be used in modeling or otherwise generating the vulnerability profile.

In the preceding description, for purposes of explanation, numerous specific details are set forth in order to provide a thorough understanding of the disclosure. It will be apparent, however, that the disclosure can be practiced without these specific details. In other instances, structures and devices have been shown in block diagram form in order to avoid obscuring the disclosure. For example, the present disclosure has been described in some implementations above with reference to interfaces and particular hardware. However, the present disclosure applies to any type of computing device that can receive data and commands, and any devices providing security services.

Reference in the specification to "one implementation" or "an implementation" means that a particular feature, structure, or characteristic described in connection with the implementation is included in at least one implementation of the disclosure. The appearances of the phrase "in one implementation" or "in some implementations" in various places in the specification are not necessarily all referring to the same implementation.

Some portions of the detailed descriptions above are presented in terms of algorithms, modules, and symbolic representations of operations on data bits within a computer memory. These algorithmic descriptions and representations are the means used by those skilled in data processing arts to most effectively convey the substance of their work to others skilled in the art.

The present disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosure can take the form of an entirely hardware implementation, an entirely software implementation or an implementation containing both hardware and software elements. In some implementations, the disclosure is implemented in software, which includes but is not limited to firmware, resident software, microcode, etc.

Furthermore, the disclosure can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

Finally, the foregoing description of the implementations of the present disclosure has been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory or significant, and the mechanisms that implement the present disclosure or its features may have different names, divisions and/or formats. Furthermore, the relevant art, the modules, routines, features, attributes, methodologies and other aspects of the present disclosure can be implemented as software, hardware, firmware or any combination of the three. Also, wherever a component, an example of which is a module, of the present disclosure is implemented as software, the component can be implemented as a standalone program, as part of a larger program, as a plurality of separate programs, as a statically or dynamically linked library, as a kernel loadable module, as a device driver, and/or in every and any other way known now or in the future in the art of computer programming. Additionally, the present disclosure is in no way limited to implementation in any specific programming language, or for any specific operating system or environment. Accordingly, the disclosure of the present disclosure is intended to be illustrative, but not limiting, of the scope of the present disclosure, which is set forth in the following claims.

What is claimed is:

1. A method comprising:
    receiving, using one or more computing device processors, network data associated with a first asset communicatively coupled to a network, wherein the network data comprises:
        first data associated with criticality information of the first asset,
        second data associated with configuration information of the first asset,
        third data associated with malware information associated with the first asset,
        fourth data associated with a software cycle information of the first asset, and
        fifth data associated with location information of the first asset;
    determining, using the one or more computing device processors, based on the first data, a first vulnerability parameter of the first asset, wherein the criticality information of the first asset parameterizes the first vulnerability parameter of the first asset;
    quantifying, using the one or more computing device processors, the second data, the third data, the fourth data, and the fifth data;
    generating, using the one or more computing device processors and based on the quantified second data, the quantified third data, the quantified fourth data, the quantified fifth data, and the first vulnerability parameter, a first risk parameter for the first asset, wherein the first risk parameter indicates an exploitability assessment of the first asset communicatively coupled to the network relative to an exploitability assessment of a second asset communicatively coupled to the network within a first time window;
    determining, using the one or more computing device processors and based on the first risk parameter, that the first asset is at a higher risk from a security breach relative to the second asset; and
    initiating, using the one or more computing device processors and based on determining that the first asset is at a higher risk from the security breach relative to the second asset, generation of one or more security operations that mitigate against the security breach, the one or more security operations comprising a sequence of operations that at least partially secure the first asset against the security breach.

2. The method of claim 1, wherein the first data indicates at least one of:
    an asset type for the first asset communicatively coupled to the network, and
    usage data of the first asset communicatively coupled to the network relative to usage data of the second asset communicatively coupled to the network.

3. The method of claim 2, wherein the asset type indicates whether the first asset:
    is a production system comprised in a plurality of systems communicatively coupled to the network,
    is a system hosting a production system communicatively coupled to the network,
    is a system hosting a production database communicatively coupled to the network,
    is an internal system that is not visible to entities outside the network, or
    is an internal system for testing and development computing operations on the network.

4. The method of claim 1, wherein the first data is based on one or more of:
    parameterized criticality data associated with the first asset communicatively coupled to the network, the second asset communicatively coupled to the network, or a third asset communicatively coupled to the network,
    synchronized system data derived from at least aggregated security logs associated with the first asset communicatively coupled to the network, the second asset communicatively coupled to the network, or the third asset communicatively coupled to the network,
    software data derived from a first analysis of one or more software being executed using the first asset communicatively coupled to the network or the second asset communicatively coupled to the network, or the third asset communicatively coupled to the network, and
    hardware data derived from a second analysis of one or more hardware used to implement the first asset communicatively coupled to the network, the second asset communicatively coupled to the network, or the third asset communicatively coupled to the network.

5. The method of claim 4, wherein the first risk parameter is an aggregate of quantified risks associated with one or more of the first asset communicatively coupled to the network, the second asset communicatively coupled to the network, or the third asset communicatively coupled to the network.

6. The method of claim 1, wherein the first vulnerability parameter is correlated with vulnerability data associated with one or more assets communicatively coupled to the network to generate the first risk parameter.

7. The method of claim 1, wherein the configuration information indicates one or more of:
    a first security configuration data indicating a configuration of one or more software associated with the communicatively coupled to the network or the second asset communicatively coupled to the network, and a second security configuration data indicating a configuration of one or more hardware associated with the communicatively coupled to the network or the second asset communicatively coupled to the network.

8. The method of claim 1, wherein:

the malware information comprises malware detection data captured within the network or outside the network, and the software cycle information indicates whether one or more software associated with the first asset or associated with the second asset has a new software update is available.

9. The method of claim 1, wherein the security breach comprises one or more attack execution operations against the first asset communicatively coupled to the network or the second asset communicatively coupled to the network.

10. The method of claim 1, wherein the location information comprises data indicating:

whether the first asset communicatively coupled to the network or the second asset communicatively coupled to the network are located in the same location or are located in disparate locations, whether the network is isolated from external networks, or whether the first asset or the second asset are communicatively coupled to the network using a virtual private network (VPN).

11. The method of claim 1, wherein the first asset comprises a computing device.

12. A system comprising:

one or more computing system processors; and memory storing instructions, such that, when executed by the one or more computing system processors, causes the system to:

receive network data associated with a first asset communicatively coupled to a network, wherein the network data comprises:

first data associated with criticality information of the first asset, second data associated with configuration information of the first asset, third data associated with malware information associated with the first asset, fourth data associated with a software cycle information of the first asset, and fifth data associated with location information of the first asset;

determine based on the first data, a first vulnerability parameter of the first asset, wherein the criticality information of the first asset parameterizes the first vulnerability parameter of the first asset;

quantify the second data, the third data, the fourth data, and the fifth data;

generate, based on the quantified second data, the quantified third data, the quantified fourth data, the quantified fifth data, and the first vulnerability parameter, a first risk parameter for the first asset, wherein the first risk parameter indicates an exploitability assessment of the first asset communicatively coupled to the network relative to an exploitability assessment of a second asset communicatively coupled to the network within a first time window;

determine, based on the first risk parameter, that the first asset is at a higher risk from a security breach relative to the second asset; and initiate, based on determining that the first asset is at a higher risk from the security breach relative to the second asset, generation of one or more security operations that mitigate against the security breach, the one or more security operations comprising a sequence of operations that at least partially secure the first asset against the security breach.

13. The system of claim 12, wherein the first data indicates at least one of:

an asset type for the first asset communicatively coupled to the network, and usage data of the first asset communicatively coupled to the network relative to usage data of the second asset communicatively coupled to the network.

14. The system of claim 13, wherein the asset type indicates whether the first asset:

is a production system comprised in a plurality of systems communicatively coupled to the network, is a system hosting a production system communicatively coupled to the network, is a system hosting a production database communicatively coupled to the network, is an internal system that is not visible to entities outside the network, or is an internal system for testing and development computing operations on the network.

15. The system of claim 12, wherein the first data is based on one or more of:

parameterized criticality data associated with the first asset communicatively coupled to the network, the second asset communicatively coupled to the network, or a third asset communicatively coupled to the network, synchronized system data derived from at least aggregated security logs associated with the first asset communicatively coupled to the network, the second asset communicatively coupled to the network, or the third asset communicatively coupled to the network, software data derived from a first analysis of one or more software being executed using the first asset communicatively coupled to the network or the second asset communicatively coupled to the network, or the third asset communicatively coupled to the network, and hardware data derived from a second analysis of one or more hardware used to implement the first asset communicatively coupled to the network, the second asset communicatively coupled to the network, or the third asset communicatively coupled to the network.

16. The system of claim 15, wherein the first risk parameter is an aggregate of quantified risks associated with one or more of the first asset communicatively coupled to the network, the second asset communicatively coupled to the network, or the third asset communicatively coupled to the network.

17. The system of claim 12, wherein the first vulnerability parameter is correlated with vulnerability data associated with one or more assets communicatively coupled to the network to generate the first risk parameter.

18. The system of claim 12, wherein the configuration information indicates one or more of:

a first security configuration data indicating a configuration of one or more software associated with the communicatively coupled to the network or the second asset communicatively coupled to the network, and a second security configuration data indicating a configuration of one or more hardware associated with the communicatively coupled to the network or the second asset communicatively coupled to the network.

19. The system of claim 12, wherein:
the malware information comprises malware detection data captured within the network or outside the network, and
the software cycle information indicates whether one or more software associated with the first asset or associated with the second asset has a new software update is available.

20. A method for determining asset risk and mitigating against said asset risk, the method comprising:
receiving, using one or more computing device processors, network data associated with a first asset communicatively coupled to a network, wherein the network data comprises:
first data associated with criticality information of the first asset,
second data associated with configuration information of the first asset,
third data associated with malware information associated with the first asset,
fourth data associated with a software cycle information of the first asset, or
fifth data associated with location information of the first asset;

quantifying, using the one or more computing device processors, the first data, the second data, the third data, the fourth data, and the fifth data;
generating, using the one or more computing device processors and based on the quantified first data, the quantified second data, the quantified third data, the quantified fourth data, the quantified fifth data, a first risk parameter for the first asset, wherein the first risk parameter indicates an exploitability assessment of the first asset communicatively coupled to the network relative to an exploitability assessment of a second asset communicatively coupled to the network within a first time window;
determining, using the one or more computing device processors and based on the first risk parameter, that the first asset is at a higher risk from a security breach relative to the second asset; and
initiating, using the one or more computing device processors and based on determining that the first asset is at a higher risk from the security breach relative to the second asset, generation of one or more security operations that mitigate against the security breach, the one or more security operations comprising a sequence of operations that at least partially secure the first asset against the security breach.

\* \* \* \* \*